United States Patent
Shea et al.

(10) Patent No.: US 9,570,901 B2
(45) Date of Patent: Feb. 14, 2017

(54) ELECTRONIC CIRCUIT AND LOW VOLTAGE ARC FLASH SYSTEM INCLUDING AN ELECTROMAGNETIC TRIGGER

(71) Applicant: EATON CORPORATION, Cleveland, OH (US)

(72) Inventors: John J. Shea, Pittsburgh, PA (US); Mark A. Juds, New Berlin, WI (US); Christian Ruempler, Marshall Township, PA (US)

(73) Assignee: EATON CORPORATION, Cleveland, OH (US)

( * ) Notice: Subject to any disclaimer, the term of this patent is extended or adjusted under 35 U.S.C. 154(b) by 412 days.

(21) Appl. No.: 14/181,929

(22) Filed: Feb. 17, 2014

(65) Prior Publication Data

US 2015/0236496 A1 Aug. 20, 2015

(51) Int. Cl.
*H02H 1/00* (2006.01)
*H01H 71/74* (2006.01)

(52) U.S. Cl.
CPC ....... *H02H 1/0023* (2013.01); *H01H 71/7463* (2013.01)

(58) Field of Classification Search
USPC ...................................... 361/13, 14, 42, 126
See application file for complete search history.

(56) References Cited

U.S. PATENT DOCUMENTS

| | | | |
|---|---|---|---|
| 6,141,192 A | 10/2000 | Garzon | |
| 6,724,604 B2 | 4/2004 | Shea | |
| 6,839,209 B2 | 1/2005 | Shea et al. | |
| 7,140,702 B2 | 11/2006 | Byron et al. | |
| 7,145,757 B2 | 12/2006 | Shea et al. | |
| 7,800,888 B2 | 9/2010 | Morris et al. | |
| 7,929,260 B2 | 4/2011 | Roscoe et al. | |
| 8,199,022 B2 | 6/2012 | Morris et al. | |
| 8,228,652 B2 | 7/2012 | Yanniello | |
| 8,284,541 B2 | 10/2012 | Shea et al. | |
| 8,305,736 B2 | 11/2012 | Yee et al. | |
| 8,319,136 B2 * | 11/2012 | Byron | H01H 33/66 218/126 |
| 8,350,175 B2 | 1/2013 | Delfino et al. | |
| 2003/0231443 A1 * | 12/2003 | Shea | H01H 39/004 361/42 |
| 2005/0219020 A1 | 10/2005 | Wabner | |
| 2006/0067018 A1 | 3/2006 | Malkowski, Jr. et al. | |

(Continued)

FOREIGN PATENT DOCUMENTS

| | | | | |
|---|---|---|---|---|
| DE | 10126849 | * 12/2002 | ......... | H01H 71/2463 |
| EP | 2 675 033 A1 | 12/2013 | | |
| WO | 2008/138557 A1 | 11/2008 | | |

OTHER PUBLICATIONS

European Patent Office, "International Search Report and Written Opinion", PCT/US2015/011309, May 20, 2015, 9 pp.

*Primary Examiner* — Thienvu Tran
*Assistant Examiner* — Angela Brooks
(74) *Attorney, Agent, or Firm* — Eckert Seamans; Philip Levy

(57) ABSTRACT

An electronic circuit includes a number of sensors structured to detect an arc flash from an uncontrolled arcing fault, and a trigger circuit, responsive to the detected arc flash, structured to trigger a triggering mechanism and cause a breakdown of a number of gaps within a low voltage arc flash switch.

24 Claims, 13 Drawing Sheets

(56) References Cited

U.S. PATENT DOCUMENTS

| | | |
|---|---|---|
| 2008/0170344 A1 | 7/2008 | Byron |
| 2009/0308845 A1 | 12/2009 | Bohori et al. |
| 2011/0285483 A1 | 11/2011 | Morris et al. |
| 2011/0315662 A1* | 12/2011 | Byron ............... H01H 33/66 218/140 |
| 2012/0057263 A1 | 3/2012 | Roscoe et al. |
| 2012/0097413 A1 | 4/2012 | Bugaris et al. |
| 2012/0168407 A1 | 7/2012 | Delfino et al. |
| 2012/0169208 A1 | 7/2012 | Engel et al. |
| 2013/0033796 A1* | 2/2013 | Shea ............... H01H 39/004 361/126 |
| 2013/0120879 A1* | 5/2013 | Shea ............... H01T 2/02 361/13 |
| 2015/0236495 A1* | 8/2015 | Shea ............... H02H 1/0015 361/54 |

* cited by examiner

ELECTRONIC CIRCUIT AND LOW VOLTAGE ARC FLASH SYSTEM INCLUDING AN ELECTROMAGNETIC TRIGGER

CROSS-REFERENCE TO RELATED APPLICATION

This application is related to commonly assigned, copending U.S. patent application Ser. No. 14/181,929, filed Feb. 17, 2014, entitled "Low Voltage Arc Flash Switch".

BACKGROUND

Field

The disclosed concept pertains generally to arc flash mitigation and, more particularly, to trigger circuits for low voltage arc flash switches. The disclosed concept also pertains to low voltage arc flash systems including a number of trigger circuits.

Background Information

Arc flash mitigation is needed in low voltage power applications. Arc flash hazards are particularly dangerous when maintenance is performed on energized equipment (e.g., without limitation, motor-control centers (MCCs)). Often, service doors are opened during maintenance, which increases the likelihood of maintenance personnel getting injured if they make a mistake. Also, other dangerous arc flash situations can involve degraded insulation or animals creating shorts across energized conductors.

There is room for improvement in low voltage arc flash systems.

SUMMARY

These needs and others are met by embodiments of the disclosed concept in which a trigger circuit responds to a detected arc flash and triggers a triggering mechanism in order to cause a breakdown of a number of gaps within a low voltage arc flash switch.

In accordance with one aspect of the disclosed concept, an electronic circuit comprises: a number of sensors structured to detect an arc flash from an uncontrolled arcing fault; and a trigger circuit, responsive to the detected arc flash, structured to trigger a triggering mechanism and cause a breakdown of a number of gaps within a low voltage arc flash switch.

As another aspect of the disclosed concept, a low voltage arc flash system comprises: a low voltage arc flash switch including a number of gaps within the low voltage arc flash switch; a number of triggering mechanisms, one for each of the number of gaps; and an electronic circuit comprising: a number of sensors structured to detect an arc flash from an uncontrolled arcing fault, and a trigger circuit, responsive to the detected arc flash, structured to trigger the number of triggering mechanisms and cause a breakdown of the number of gaps within the low voltage arc flash switch.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed low voltage (i.e., less than 1000 $V_{RMS}$) arc flash switch employs a triggering mechanism, such as an electromagnetic trigger or fusible link, to trigger the device. The example triggering mechanism causes a breakdown of a gap between conductors in a sealed housing, which can optionally be pressurized. The switch includes suitably high melting point metal conductors enclosed in a sealed container structured to contain an arcing fault. Upon detection of an uncontrolled external arcing fault, the example triggering mechanism is initiated which causes the external arcing fault to commutate into the sealed switch, thereby eliminating the external arcing fault and protecting personnel and equipment from arcing damage.

Figure 1:
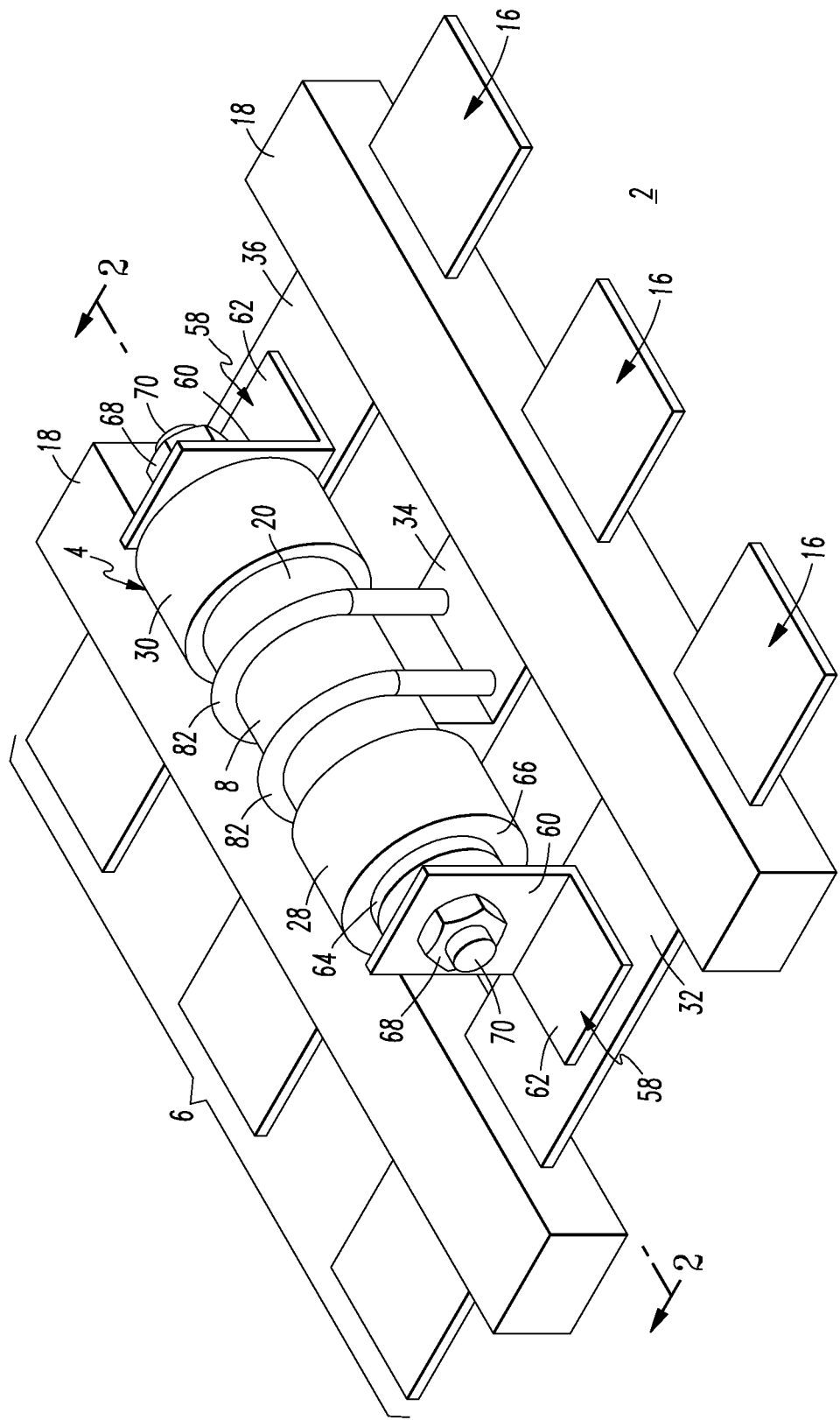
FIG. 1 is an isometric view of system including a low voltage arc flash switch and a three-phase power bus in accordance with embodiments of the disclosed concept.
Figure 2:
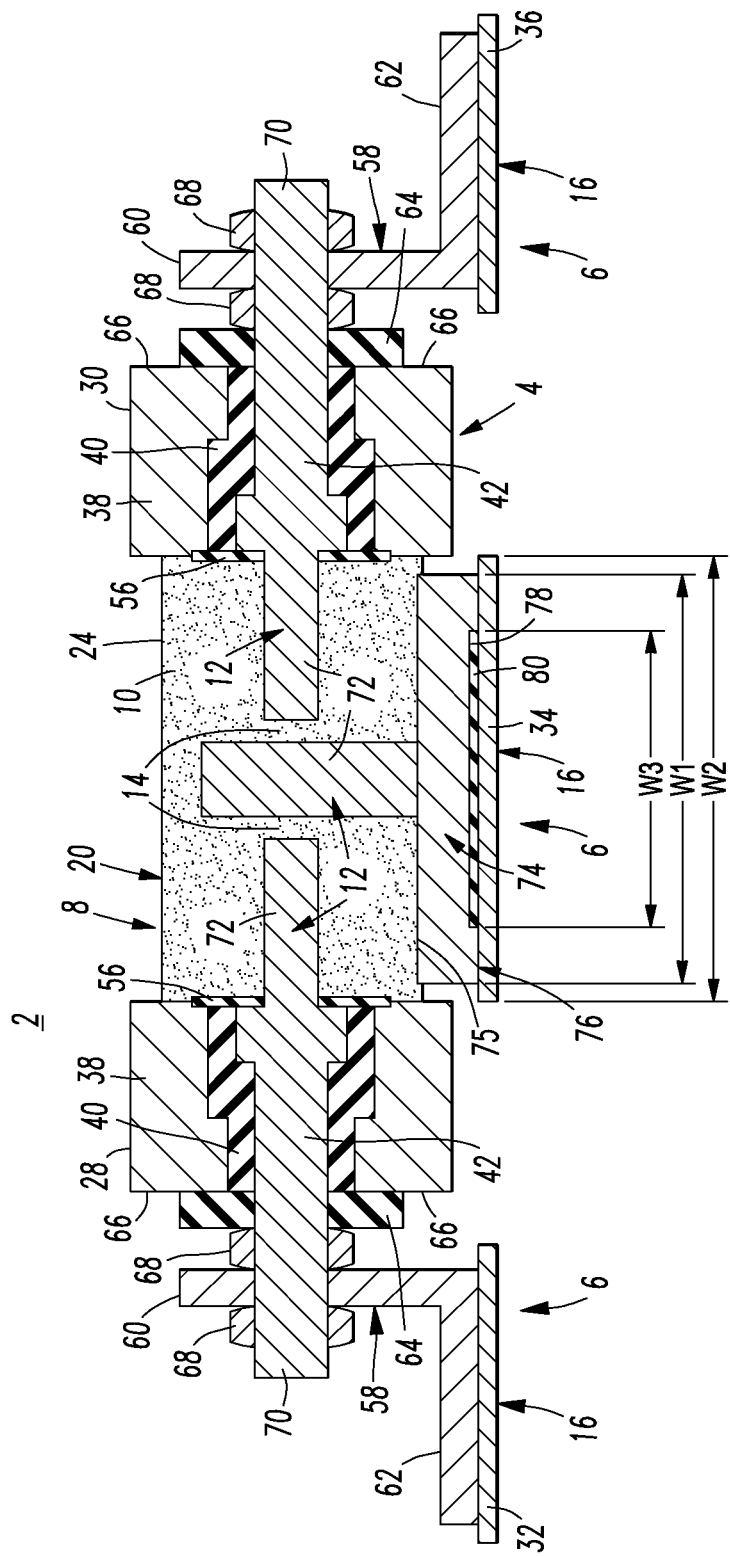
FIG. 2 is a cross-sectional view of the low voltage arc flash switch and the three-phase power bus along lines 2-2 of FIG. 1.
Figure 3:
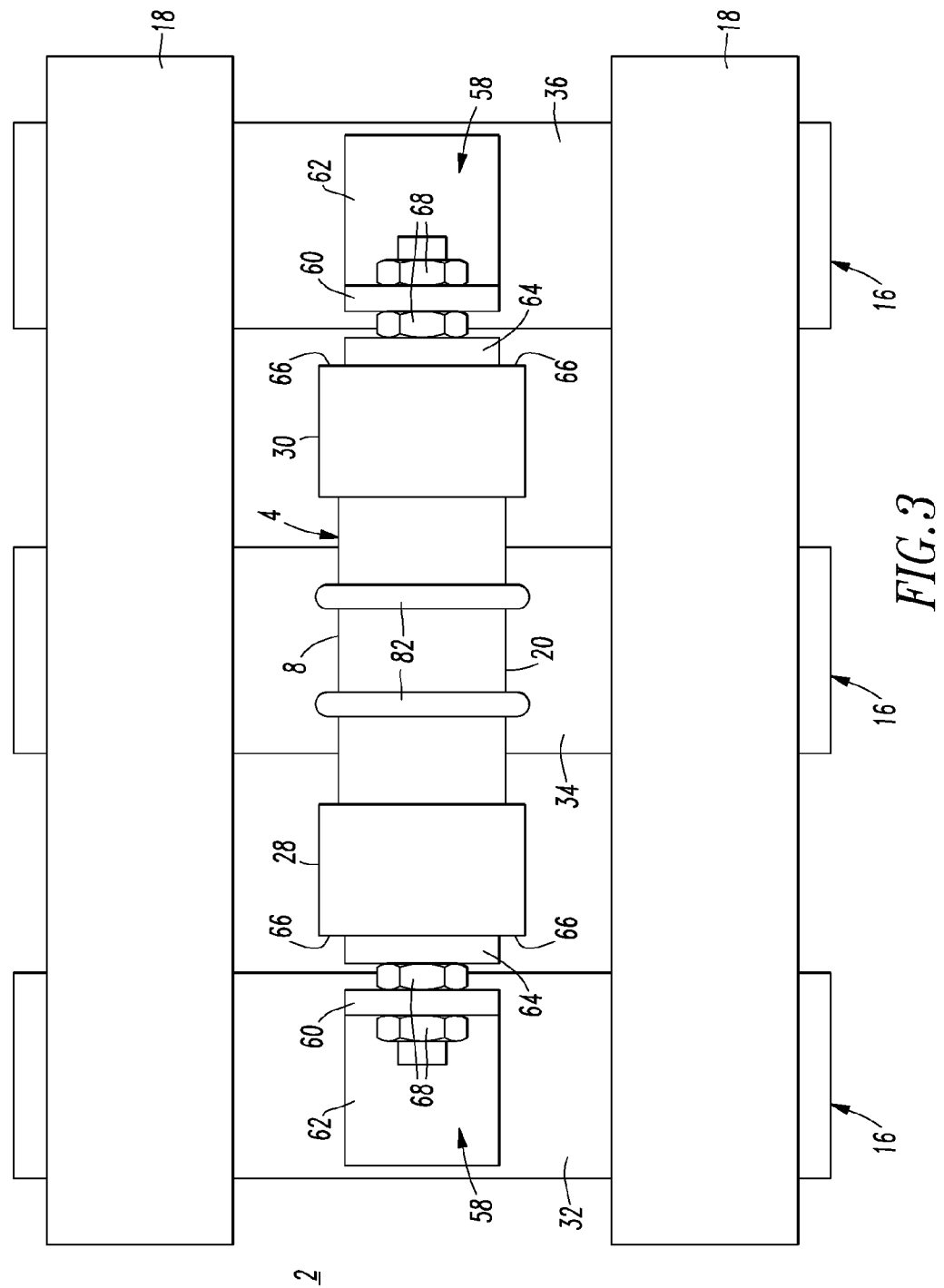
FIG. 3 is a top plan view of the low voltage arc flash switch and the three-phase power bus of FIG. 1.

Referring to FIGS. 1-3, a low voltage power system 2 includes a low voltage arc flash switch 4 and a three-phase low voltage power bus 6. The low voltage arc flash switch 4 includes a sealed housing 8, gas insulation 10 (FIG. 2) within the sealed housing 8, a plurality (e.g., without limitation; two; three; greater than three) of conductors 12 (FIG. 2) including a number (e.g., without limitation; one; two; greater than two) of gaps 14 (FIG. 2) therebetween within the sealed housing 8, and a triggering mechanism 15 (shown in FIG. 10 in connection with a single gap 138), structured to cause a breakdown of the number of gaps 14.

The example three-phase low voltage power bus 6 includes three low voltage power bus bars 16, which are optionally supported by insulative (e.g., without limitation, GP03; red glass) support braces 18. The three low voltage power bus bars 16 carry a three-phase alternating current low voltage, which is received by the three example conductors 12 shown in FIG. 2.

As will be discussed, the example triggering mechanism 15 places an arcing fault across the three conductors 12 within the sealed housing 8, in order to eliminate an uncontrolled arcing fault (e.g., without limitation, phase-to-phase; phase-to-ground) external to the sealed housing 8. For example, the triggering mechanism 15 is structured to cause the uncontrolled arcing fault external to the sealed housing 8 to commutate into the sealed housing 8, thereby eliminating the uncontrolled arcing fault.

For example and without limitation, a first voltage across each of the two example gaps 14 shown in FIG. 2 is about 25 $V_{RMS}$ to about 120 $V_{RMS}$. Before the uncontrolled arcing fault, a second voltage between two phases of the example three-phase alternating current low voltage is any suitable low voltage (e.g., without limitation, typically about 208 $V_{RMS}$ to about 690 $V_{RMS}$; any suitable low voltage less than 1000 $V_{RMS}$ or less than 1500 $V_{DC}$). Fault currents from the arcing fault across the three example conductors 12 are conducted within the sealed housing 8 for up to about 30 line cycles. Since the low voltage arc flash switch 4 is a sealed unit, no exhaust gas escapes from the sealed housing 8 responsive to the uncontrolled arcing fault commutated into the sealed housing 8. The uncontrolled arcing fault is advantageously commutated in under 3 ms. Hence, the arcing fault is commutated into the sealed container 8 across all three example phases, thereby eliminating the arc flash hazard in under 3 ms. Fault currents can be contained for up to about 30 cycles. This results in a significant current limiting (e.g., about a 20% to 40% reduction) thereby protecting upstream equipment from thermal and mechanical stress.

As a non-limiting example, the example conductors 12 are made of tungsten. The gas insulation 10 is a number (e.g., one gas; a mixture of gasses) of gasses selected from the group consisting of nitrogen, hydrogen, argon, sulfur hexafluoride, helium, and air. The gas insulation 10 has a nominal quiescent pressure within the sealed housing 8 of between $10^{-7}$ Torr and $10^4$ Torr, where one atmosphere is equal to 760 Torr (101,325 Pa.).

Figure 4:
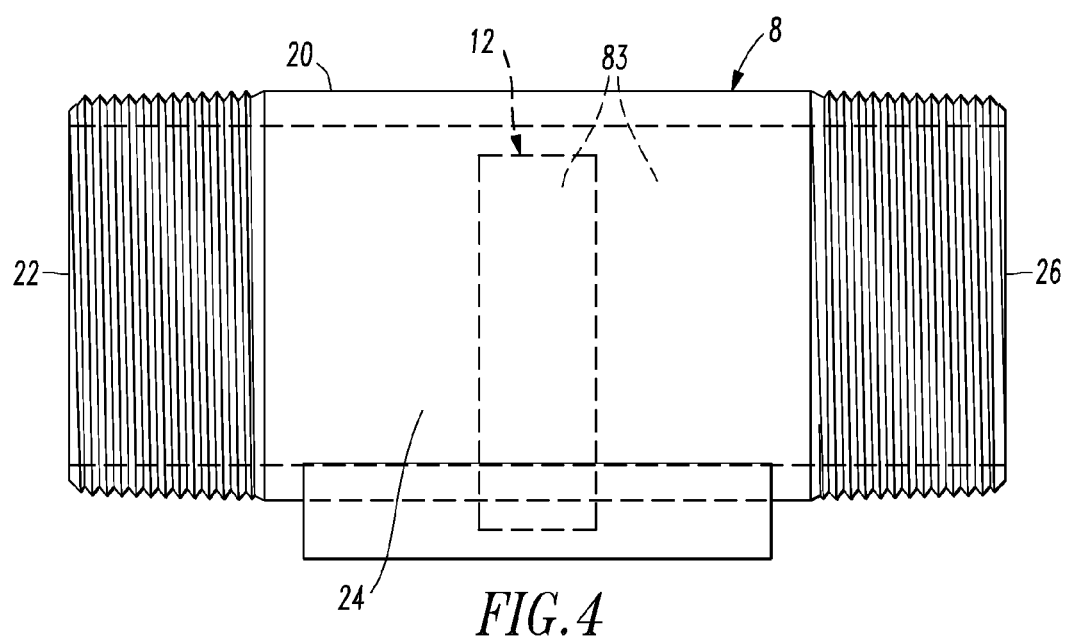
FIG. 4 is a vertical elevation view of the elongated conductive cylinder and support of FIG. 1.

As shown in FIGS. 3 and 4, the example sealed housing 8 includes an elongated conductive cylinder 20 having a first end 22, an intermediate portion 24 and an opposite second end 26. A first conductive end cap 28 (FIG. 3) is coupled to the first end 22, and a second conductive end cap 30 (FIG. 3) is coupled to the opposite second end 26. The cylinder 20 and the end caps 28,30 can be made, for example and without limitation, of stainless steel. The end caps 28,30 are preferably brazed, welded or threaded to the respective ends 22,26 of the elongated conductive cylinder 20.

A first one (e.g., without limitation, phase A) of the three conductors 12 passes through the first conductive end cap 28 and is structured to be electrically and mechanically coupled to a first bus bar 32 energized by a first phase of the three-phase alternating current low voltage. A second one (e.g., without limitation, phase B) of the three conductors 12 passes through the intermediate portion 24 of the elongated conductive cylinder 20 and is structured to be electrically and mechanically coupled to a second bus bar 34 energized by a second phase of the three-phase alternating current low voltage. A third one (e.g., without limitation, phase C) of the three conductors 12 passes through the second conductive end cap 30 and is structured to be electrically and mechanically coupled to a third bus bar 36 energized by a third phase of the three-phase alternating current low voltage.

Figure 6:
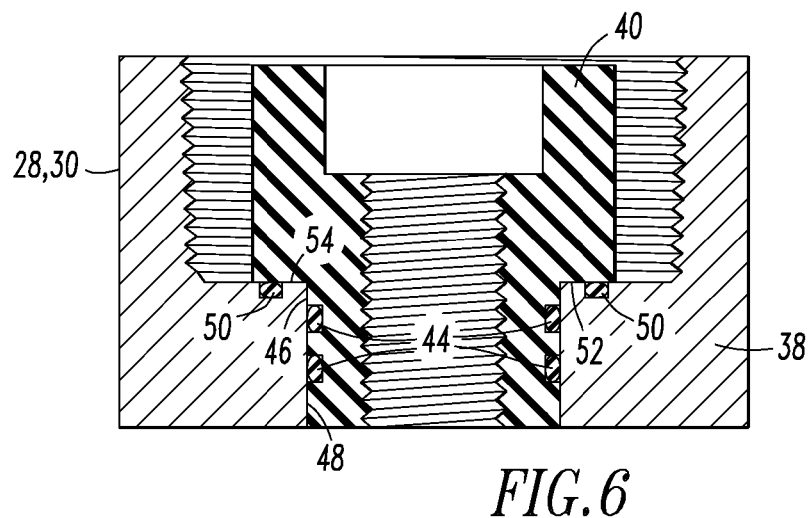
FIG. 6 is a cross-sectional view of one of the end caps of FIG. 1.

As shown in FIG. 6, each of the example end caps 28,30 includes an outer conductive end cap portion 38 electrically and mechanically coupled to a corresponding one of the ends 22,26 of the elongated conductive cylinder 20, and an inner insulator member 40 carrying an inner conductive portion 42 (FIG. 2) (e.g., without limitation, made of copper; steel) of a corresponding one of the first and third ones (e.g., without limitation, phases A and C) of the three conductors 12. A number (e.g., without limitation, two are shown in FIG. 6) of axial O-ring seals 44 seal a first surface 46 of the inner insulator member 40 to a first surface 48 of the outer conductive end cap portion 38. A compression O-ring seal 50 (e.g., without limitation, made of Viton® synthetic rubber) seals a second surface 52 of the inner insulator member 40 to a second surface 54 of the outer conductive end cap portion 38. The example seals 44,50 seal the outer conductive end cap portion 38 to the inner insulator member 40.

As shown in FIG. 2, an insulative disk 56 (e.g., without limitation, made of alumina; Macor® glass-ceramic material; silicon carbide) within the sealed housing 8 encloses the inner conductive portion 42 of the corresponding first and third conductors 12 and the inner insulator member 40 within the outer conductive end cap portion 38 and away from the two example gaps 14 within the sealed housing 8. Each of the first and third conductors 12 includes an angled conductive bracket 58 (e.g., without limitation, made of copper) having a first portion 60 electrically coupled to a corresponding one of the first and third conductors 12 and a second portion 62 structured to be electrically coupled to a corresponding one of the first and third bus bars 32,36. Each of the conductive end caps 28,30 further includes an insulative disk 64 (e.g., without limitation, made of a G10 glass reinforced epoxy) outside of the sealed housing 8 enclosing the inner conductive portion 42 of the corresponding one of the first and third conductors 12 and the inner insulator member 40 within the outer conductive end cap portion 38 and away from exterior surface 66 of the conductive end cap portion 38.

The insulative disk 56 advantageously protects the inner conductive portion 42 and the other insulative disk 64. The insulative disk 64 advantageously provides insulation for a suitable over surface distance (e.g., between the B-A phases or between the B-C phases since phase B is electrically connected to the elongated conductive cylinder 20 and the end caps 28,30). A number of nuts 68 (e.g., without limitation, made of brass; two are shown) are threaded on an outer conductive portion 70 (e.g., without limitation, made of copper) of each of the first and third conductors 12 to secure the insulative disk 64 to a corresponding one of the first and second conductive end caps 28,30. This compresses the compression O-ring seal 50 (FIG. 6), and secures the angled conductive bracket 58 to the corresponding one of the first and third conductors 12. Although an inner nut 68 is shown for locking purposes and cinching the compression O-ring seal 50, only the outer nut 68 is needed. The outer second nut 68 allows the switch 4 to be bolted to the bracket 58 (phase A or phase C) if the spacing between the inner first nut 68 and the outer second nut 68 needs to be adjusted.

Each of the first and third conductors 12 includes an inner conductive electrode 72 (shown in FIG. 5 with the B-phase conductor) (e.g., without limitation, made of tungsten; steel; copper; copper-chrome) within the sealed housing 8 and the external conductor or outer conductive portion 70 (FIGS. 1-3) (e.g., without limitation, made of copper) outside of the sealed housing 8. The inner conductive electrode 72 is brazed to the inner conductive portion 42 which is part of the external conductor 70. As a further non-limiting example, the inner conductive electrode 72 is advantageously made of tungsten, in order to provide a suitably high melting point, to reduce vapor pressure from relatively low erosion of the tungsten, and to slow pressure build up within the sealed housing 8. In the example of FIG. 2, the inner conductive electrode 72 of the second one of the three conductors 12 is normal to both of the inner conductive electrodes 72 of the second and third ones of the three conductors 12.

Figure 5:
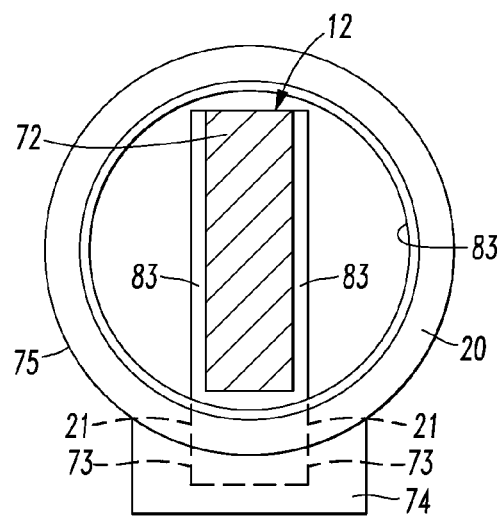
FIG. 5 is an end elevation view of the elongated conductive cylinder and support of FIG. 4.

Continuing to refer to FIG. 2, an external conductive (e.g., without limitation, made of copper) support and mounting member 74 is brazed to an exterior surface 75 of the elongated conductive (e.g., without limitation, made of stainless steel) cylinder 20. The second one of the three conductors 12 is preferably made of tungsten and is brazed to the elongated conductive cylinder 20 at locations 21 and to the external conductive support and mounting member 74 at locations 73 as best shown in FIG. 5.

The external conductive support and mounting member 74 includes a generally planar conductive surface 76 having a first width W1 structured to be electrically and mechanically coupled to the second bus bar 34, which is an elongated rectangular conductive bus bar having a larger second width W2. The second bus bar 34 is energized by the second phase of the three-phase alternating current low voltage. The generally planar conductive surface 76 includes a recess 78 having a third width W3, which is smaller than the first width W1, structured to receive an insulative planar barrier 80 (e.g., without limitation, fish paper) therein. The structure of the insulative planar barrier 80 and the resulting current flow helps to retain the arcs in the gaps 14 for the A-B phases and the B-C phases. The larger second width W2 of the second bus bar 34 allows for a reverse current loop. Current flows from the mating conductive surfaces and travels laterally (with respect to FIG. 2) towards the center of member 74. Current continues to flow vertically (with respect to FIG. 2) through the center electrode 72 across the arc formed in the gap between electrodes 72 and conductors 12 and laterally (with respect to FIG. 2) through conductors 12. This creates a magnetic field which tends to keep the arc in the gap formed between conductors 12 and electrode 72 and also tends to drive the arc upward (with respect to FIG. 2).

Referring again to FIGS. 4 and 5, an interior of the example stainless steel elongated conductive cylinder 20 is covered with a suitable thermal ceramic spray 83, which protects the conductive cylinder 20 from arcing therein. Also, as shown in FIG. 5, an internal portion of the example second tungsten conductor 12 can also be covered with the thermal ceramic spray 83, leaving a suitable portion (shown hatched) uncovered, which forms the inner conductive electrode 72.

As shown in FIG. 3, the elongated conductive cylinder 20 optionally has a number of U-clamps 82 (e.g., without limitation, made of steel) structured to electrically and mechanically couple to the second bus bar 34. These advantageously stiffen and avoid mechanical stresses, such as bending, of the bus bar 34.

Figure 7:
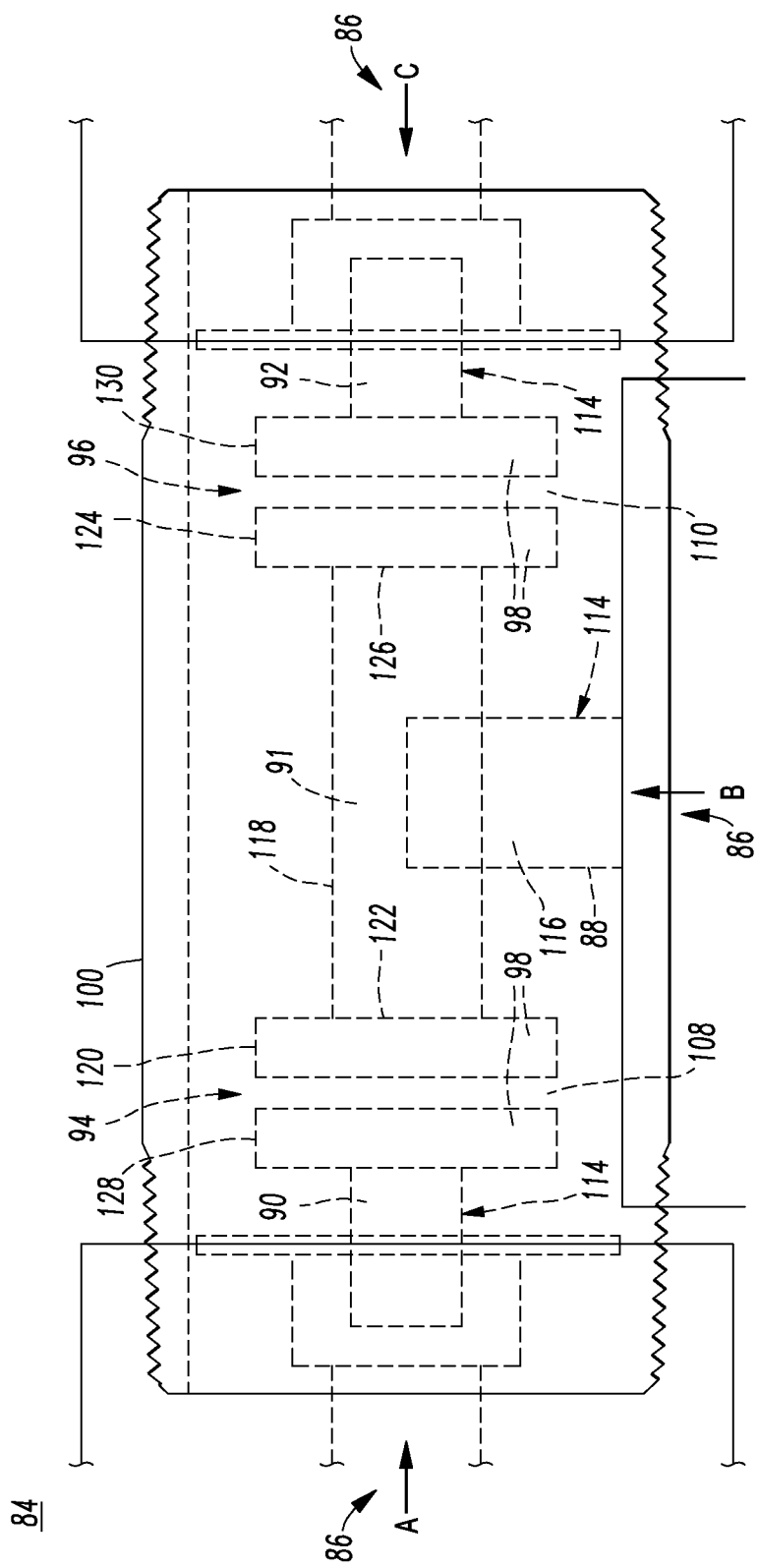
FIG. 7 is a cross-sectional view of a low voltage arc flash switch and a three-phase power bus in accordance with another embodiment of the disclosed concept.

FIG. 7 shows another low voltage arc flash switch 84, which is somewhat similar to the low voltage arc flash switch 4 of FIGS. 1-3, and a three-phase power bus 86 (having phases A, B, C). For example and without limitation, in FIG. 7, one vertical (with respect to FIG. 7) rod 88 and two horizontal (with respect to FIG. 7) rods 90,92 are made of copper and two sets 94,96 of example tungsten contacts 98 are provided. It is believed that this configuration increases the current (e.g., without limitation, from 35 kA to 65 kA with respect to the configuration of FIG. 1) and increases the time duration of arcing (e.g., without limitation, 3 to 30 cycles) while maintaining the integrity of elongated conductive cylinder 100 (e.g., without limitation, made of stainless steel).

Figure 9:
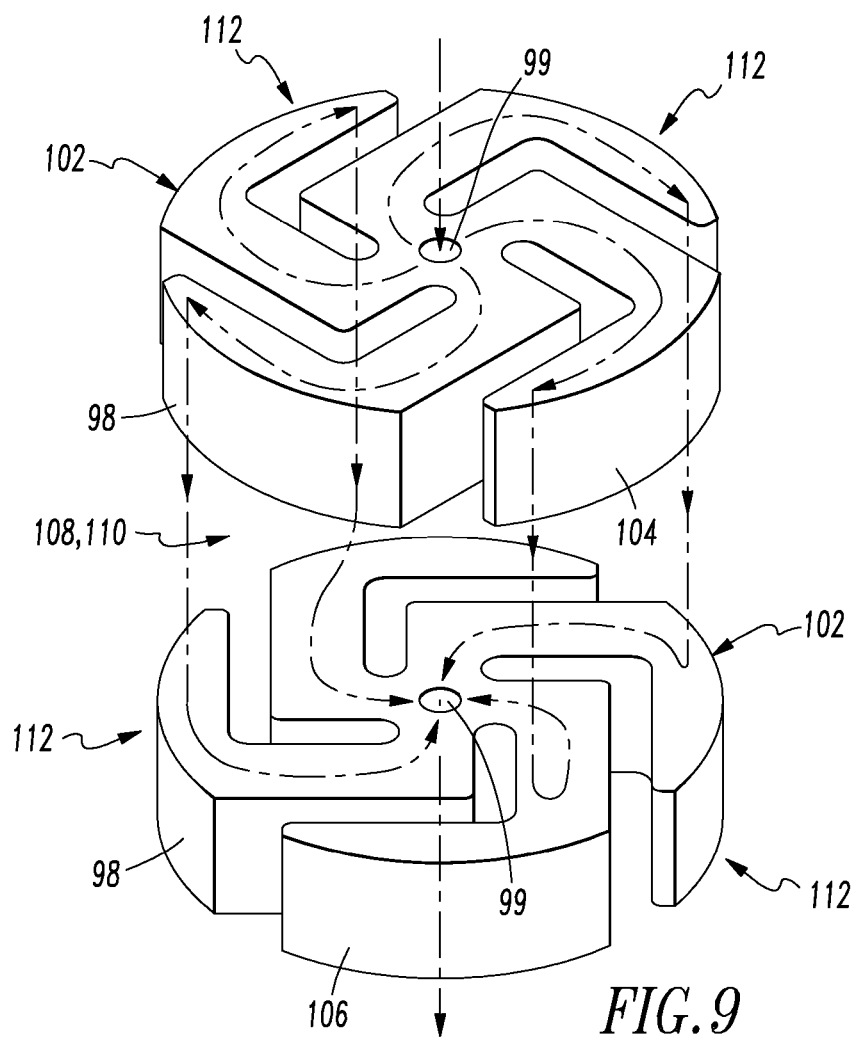
FIG. 9 is an isometric view of a pair of the metal contacts of FIG. 7.

Preferably, in this example, a different electrode geometry is employed. The addition of the example tungsten contacts 98 formed by the example tungsten contact disks 102 (shown in FIG. 9) provides a relatively larger surface area to reduce arc erosion and, more importantly, preferably employs known vacuum interrupter contact technology to rotate the arc to further minimize arc erosion of the contacts 98 as well as distribute thermal loading on the elongated conductive cylinder 100. This changes the magnetic fields and the current path. As shown in FIG. 7, the current path is directed axially along the horizontal rods 90,91,92 disposed in the center of the elongated conductive cylinder 100 to the center 99 of the tungsten contacts 98 (FIG. 9). From that point, the current moves outward on a contact pedal 104 (FIG. 9) and returns on the adjacent contact pedal 106 (FIG. 9), thereby forming a reverse loop that creates a circumferential force on the arc at each of the two gaps 108,110 to rotate the arc around the periphery of each of the contacts 98. Optionally, a ferrous steel disk (not shown) can be employed behind each tungsten contact 98 for increasing the magnetic force on the arc. The two sets 94,96 of four tungsten contacts 98 are structured to form the reverse current loop.

Figure 8:
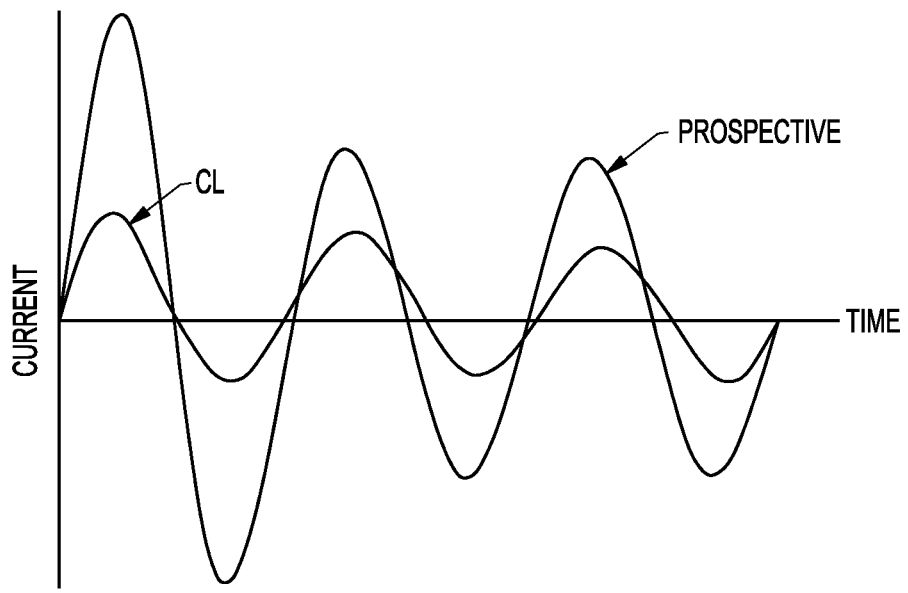
FIG. 8 is a plot of current waveforms including prospective current without a low voltage arc flash switch and limited current with the low voltage arc flash switch of FIG. 7.

FIG. 8 shows a plot of current waveforms including the prospective current without the low voltage arc flash switch 84 (FIG. 7) and the resulting current-limiting (CL) effect with the low voltage arc flash switch 84. Current-limiting is desired to reduce system stress (e.g., mechanical and thermal) and maintain arc current for a suitable number of cycles with the example gaps 108,110 (FIG. 7) and corresponding materials, as disclosed.

FIG. 9 shows two of the tungsten contacts 98 including the pedals 104,106. These contacts 98 are generally disk-shaped with a plurality of generally L-shaped arms 112 forming the contact pedals 104,106 and being structured to rotate an arc at each of the two gaps 108,110 (FIG. 7).

Referring again to FIG. 7, a first one of the three conductors 114 is T-shaped and includes a first portion 116 normal to both a second one and a third one of the three conductors 114, and a second portion 118 in-line with both the second one and the third one of the three conductors 114. The second portion 118 includes a first contact 120 at a first end 122 thereof and a second contact 124 at an opposite second end 126 thereof. The second one of the three conductors 114 includes a third contact 128 facing the first contact 120 and forming the first gap 108. The third one of the three conductors 114 includes a fourth contact 130 facing the second contact 124 and forming the second gap 110. Preferably, the contacts 120,124,128,130 are made of tungsten, and the three conductors 114 are otherwise made of copper or steel.

Figure 10:
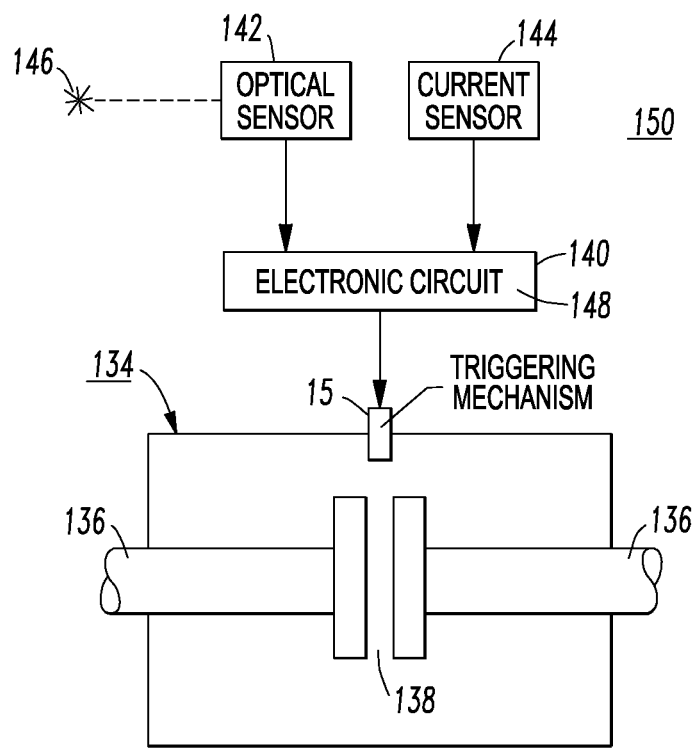
FIG. 10 is a block diagram of an electronic circuit and a low voltage arc flash switch in accordance with another embodiment of the disclosed concept.

As shown in FIG. 10, another low voltage arc flash switch 134 includes two conductors 136, and one gap 138 therebetween. The two conductors 136 are structured to receive a single phase alternating current low voltage. Otherwise, the low voltage arc flash switch 134 can be somewhat similar to the low voltage arc flash switch 4 of FIG. 1.

The electronic circuit 140 can be on board or at or near the low voltage arc flash switches 4,84,134. Optical and current sensors 142,144 detect an external arc flash 146 and trigger the electronic circuit 140 to close the low voltage arc flash switch 4,84,134.

As an alternative to the thermal ceramic spray 83 of FIGS. 4 and 5, the interior of the example stainless steel elongated conductive cylinder 20 of FIG. 1 can be formed by a graphite tube or a ceramic tube that acts as an arc shield and protects the conductive cylinder 20 from arcing therein, such as from a direct arc blast from contacts formed by the conductors 12 (FIG. 2) at the gaps 14 (FIG. 2).

In FIG. 10, the electronic circuit 140 includes the number of sensors 142,144 that detect the arc flash 146 from an uncontrolled arcing fault, and a trigger circuit 148 that triggers a number of triggering mechanisms 15 and causes a breakdown of the number of gaps 138 within the low voltage arc flash switch 134. A low voltage arc flash system 150 includes the low voltage arc flash switch 134, and the electronic circuit 140. The electronic circuit 140 can be disposed on, at or near the low voltage arc flash switch 134. The number of sensors 142,144 can be a plurality of sensors including a number of optical sensors 142 and a number of current sensors 144, as will be discussed, below, in connection with FIGS. 14-16.

As will be described, below, in connection with FIGS. 11A-11C, 12A-12B and 13A-13B, the example number of triggering mechanisms 15 can be expandable electromagnetic triggers as will be described.

Figure 11A:
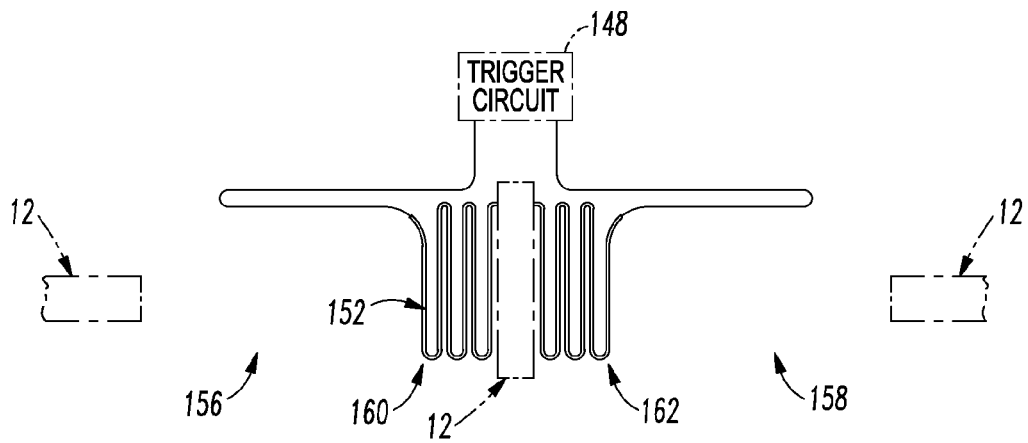
FIGS. 11A and 11B are vertical elevation views of an electromagnetic trigger for the low voltage arc flash switch of FIG. 1 in respective compressed and triggered positions.
Figure 11B:
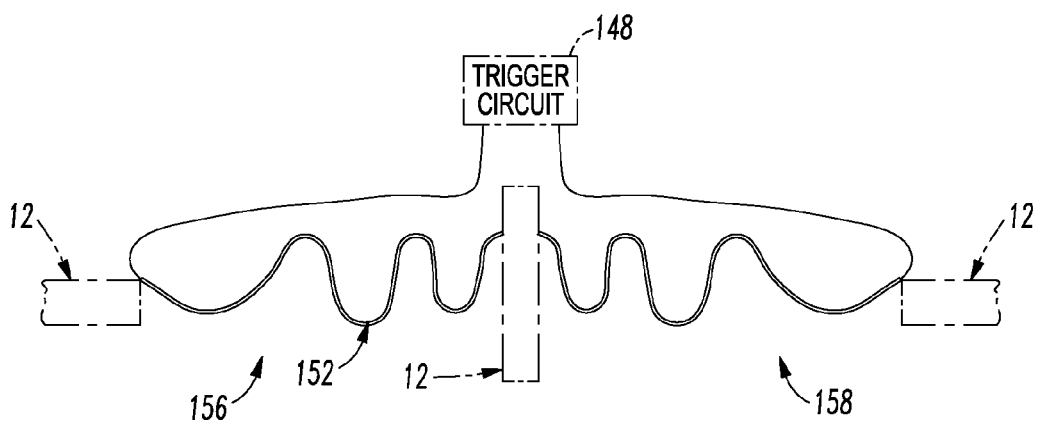

FIGS. 11A and 11B are vertical elevation views of an expandable electromagnetic trigger 152 for the low voltage arc flash switch 4 of FIG. 1 in respective compressed and triggered positions. A suitable conductor, such as an example copper ribbon or foil 154 (FIG. 11C), is accelerated across a gap 156 in order to breakdown that gap providing a switching action on the order of 800 microseconds. This provides fast and reliable triggering for the low voltage arc flash switch 4. In this example, copper ribbon and copper foil behave in a like manner in terms of electromagnetic repulsion, although a copper ribbon may not be a wide as a copper foil.

Figure 11C:
FIG. 11C is a top plan view of a copper ribbon for the electromagnetic trigger of FIG. 11A.

FIG. 11C shows the example copper ribbon or foil 154. As a non-limiting example, the copper ribbon or foil 154 has a width of about 0.1 inch (about 0.254 cm), a thickness of about 0.003 inch (about 0.00762 cm) and a height of about 0.325 inch (about 0.8255 cm). In this example, the copper ribbon or foil 154 has an accordion shape, which can extend further than a single looped conductor. The current/voltage from the trigger circuit 148 (FIG. 10) causes the copper ribbon or foil 154 to move from the compressed state (FIG. 11A) to the triggered state (FIG. 11B) as a result of electromagnetic repulsion. For example, folding the copper ribbon or foil 154 back on itself creates a "reverse" loop which causes the plural conductor folds to repel one another when a suitable current pulse is applied. The dimensions of the copper ribbon/foil 154 are preferably selected to achieve sufficiently small mass and stiffness, and sufficiently large current carrying cross sectional area, in order to achieve full displacement across the gaps 156,158 in a sufficiently short time prior to exceeding the thermal capability of the ribbon/foil (resulting in melting of the ribbon/foil).

In the example of FIGS. 11A-11B, number of gaps 138 (FIG. 10) are two gaps 156,158. As shown in FIG. 11A, there are a first plurality of folds 160 disposed within the first gap 156 and a second plurality of folds 162 disposed within the second gap 158. Each of the first plurality of folds 160 and the second plurality of folds 162 has a compressed position (FIG. 11A) before the ribbon or foil 154 is triggered by the trigger circuit 148. Also, each of the first plurality of folds 160 and the second plurality of folds 162 has a triggered position (FIG. 11B) after the conductive ribbon or foil 154 is triggered by the trigger circuit 148. The triggered position (FIG. 11B) causes the first plurality of folds 160 to expand and breakdown the first gap 156, and the second plurality of folds 162 to expand and breakdown the second gap 158. These breakdowns preferably occur in about 800 microseconds after the trigger circuit 148 triggers the example electromagnetic trigger 152. For example and without limitation, each one of both of: (a) the first plurality of folds 160 and (b) the second plurality of folds 162 can include twelve folds and forms an accordion shape.

The trigger circuit 148 outputs a current pulse to the example conductive ribbon or foil 154. Current flowing through each of the first plurality of folds 160 and the second plurality of folds 162 causes the first plurality of folds 160 to electromagnetically repel each other and causes the second plurality of folds 162 to electromagnetically repel each other, thereby causing the conductive ribbon or foil 154 to move from the compressed position (FIG. 11A) to the triggered position (FIG. 11B).

Figure 12A:
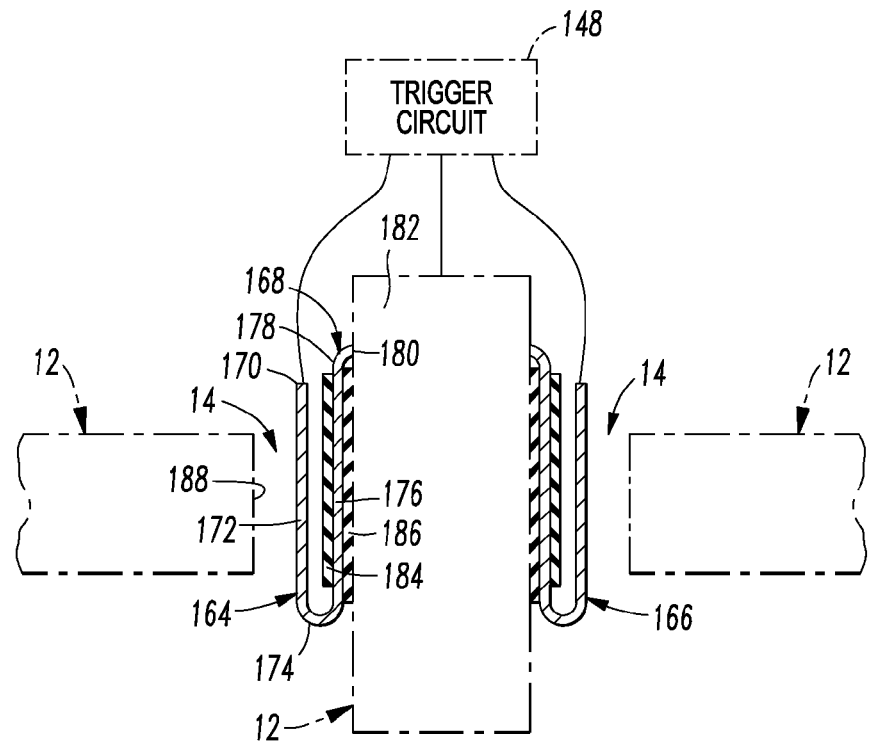
FIGS. 12A and 12B are vertical elevation views of electromagnetic triggers for the two gaps of the low voltage arc flash switch of FIG. 1 in respective compressed and triggered positions.
Figure 12B:
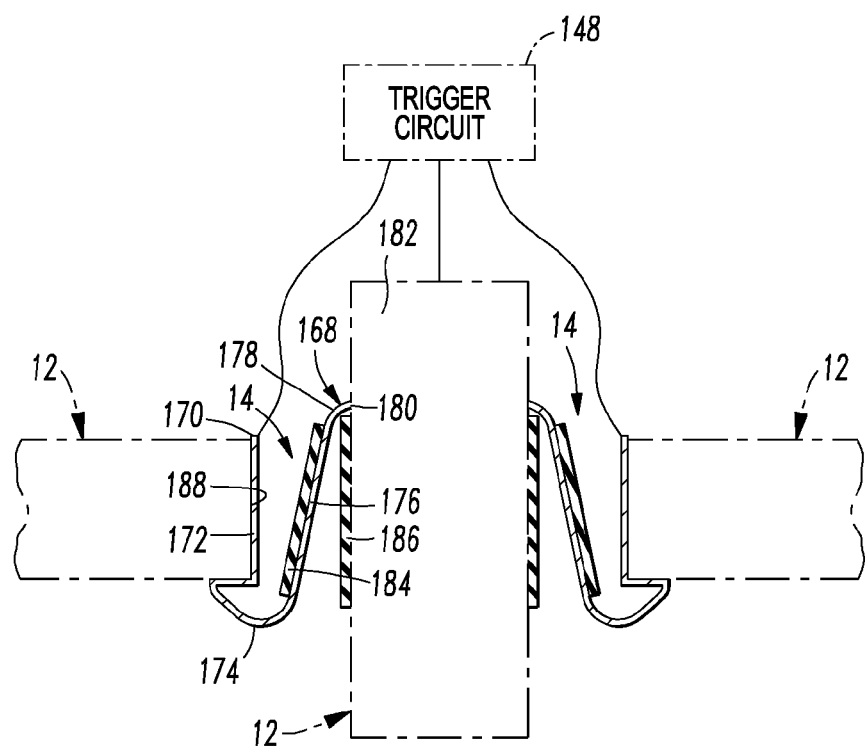

Referring to FIGS. 12A and 12B, electromagnetic triggers 164,166 for the two gaps 14 of the low voltage arc flash switch 4 of FIG. 1 are shown in respective compressed and triggered positions. These gaps 14 are formed by a first electrode or contact 12 separated from a second electrode or contact 12. It will be appreciated that these electromagnetic triggers 164,166 and the electromagnetic trigger 152 of FIGS. 11A-11B can also function for the low voltage arc flash switch 84 of FIG. 7. A triggering mechanism, such as the electromagnetic triggers 164,166, includes, for each of the number of gaps 14, a U-shaped foil or ribbon conductor 168 including a first end 170, a first elongated portion 172, a U-bend 174, a second elongated portion 176, an arcuate bend 178 and a second end 180. As shown in FIG. 12A, the second end 180 is electrically connected to a first electrode 182 and the first elongated portion 172 is parallel to the second elongated portion 176 and separated therefrom by a first insulator 184. The second elongated portion 176 is parallel to the first electrode 182 and separated therefrom by a second insulator 186. The triggering mechanism has a compressed position (FIG. 12A) before the triggering mechanism is triggered by the trigger circuit 148 (FIG. 12A), and has a triggered position (FIG. 12B) after the triggering mechanism is triggered by the trigger circuit 148. The first end 170 and the first elongated portion 172 are distal from the second electrode 188 in the compressed position (FIG. 12A), and the first elongated portion 172 electrically engages the second electrode 188 in the triggered position (FIG. 12B).

In this example, the U-shaped foil or ribbon conductor 168 is made of copper and has a thickness of about 0.003 inch (about 0.00762 cm). The trigger circuit 148 outputs a current pulse to the U-shaped foil or ribbon conductor 168. Current flows in opposite directions through the first electrode 182 and the first elongated portion 172 and through the first elongated portion 172 and the second elongated portion 176 causes the first electrode 182 to electromagnetically repel the first elongated portion 172 and causes the first elongated portion 172 to electromagnetically repel the second elongated portion 176. This causes the gaps 14 to breakdown. The electrodes 182,188 are made from, for example and without limitation, tungsten, copper, copper-chrome, or steel. The dimensions of the copper ribbon/foil 168 are preferably selected to achieve sufficiently small mass and stiffness, and sufficiently large current carrying cross sectional area, in order to achieve full displacement across the gaps 14 in a sufficiently short time. In another case, the ribbon may break during current flow but momentum will carry the ribbon across the gap 14.

Figure 13A:
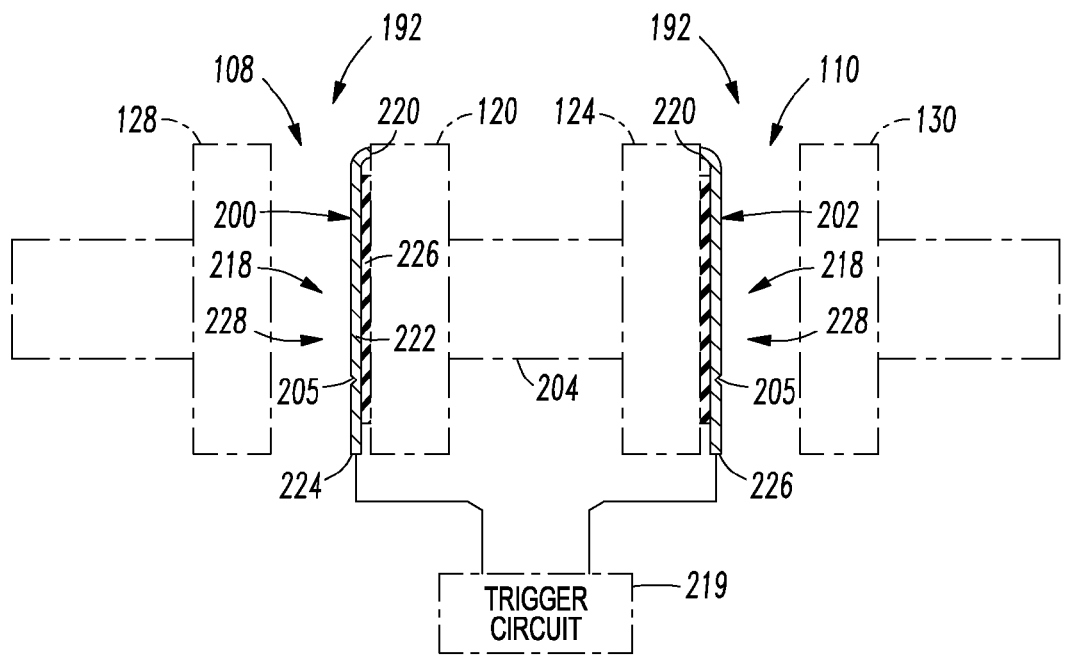
FIGS. 13A and 13B are vertical elevation views of an electromagnetic trigger for the low voltage arc flash switch of FIG. 7 in respective compressed and triggered positions.
Figure 13B:
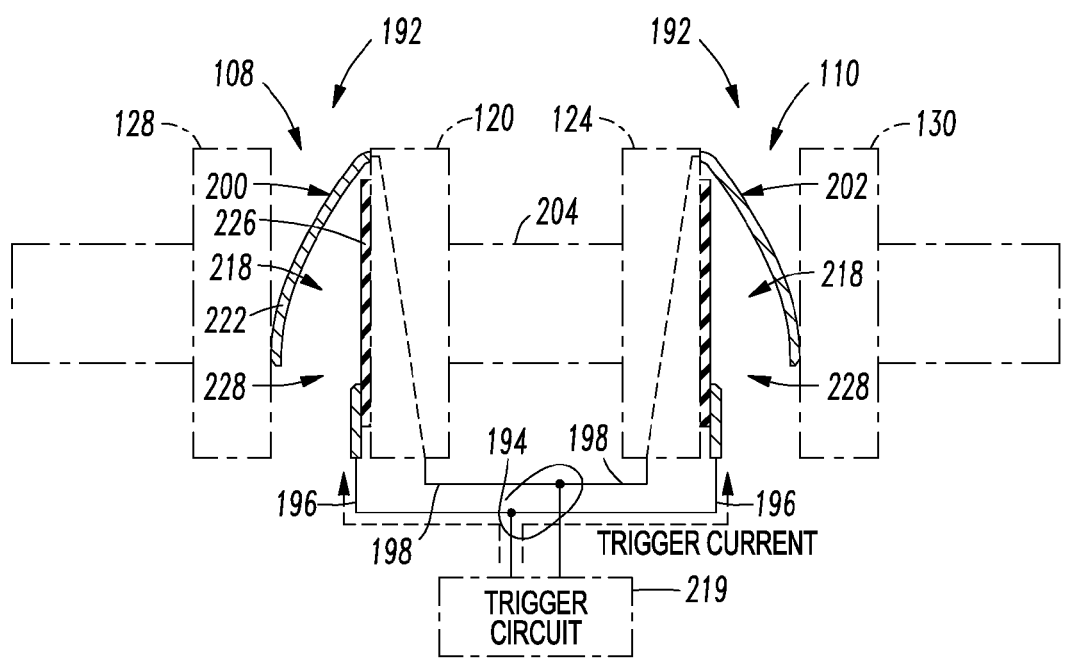

FIGS. 13A and 13B show another electromagnetic trigger 192 for the low voltage arc flash switch 84 of FIG. 7 in respective compressed and triggered positions. In this example, there are four trigger conductors 194 (FIG. 13B), with two trigger conductors 196,198 for each of the two conductive foils or ribbons 200,202, respectively. Here, the foils or ribbons 200,202 are completed insulated from the B-phase conductor 204, thereby ensuring that the trigger current passes through the ribbons 200,202 in parallel. Also, there is one folded piece of conductive ribbon as opposed to multiple folds. This is easy to construct and is faster than the relatively larger electromagnetic trigger 152 of FIGS. 11A-11B, which has more folds. The example electromagnetic trigger 192 has relatively less moving mass and a notch 205 provides a definite break point.

Each of the gaps 108,110 is formed by a first electrode 120,124 separated from a second electrode 128,130. A triggering mechanism 218 includes, for each of the gaps 108,110, the foil or ribbon conductor 200,202 including a first end 220 electrically connected to the first electrode 120,124, an elongated portion 222 and a free second end 224, with the notch 205 formed in the elongated portion 222 proximate the free second end 224. The elongated portion 222 is parallel to the first electrode 120,124 and separated therefrom by an insulator 226 in a non-triggered position (FIG. 13A). The triggering mechanism 218 has a first position (FIG. 13A) parallel to the first electrode 120,124 before the triggering mechanism 218 is triggered by a trigger circuit 219, such as the trigger circuit 148 of FIG. 10. The triggering mechanism 218 has a triggered position (FIG. 13B) after the triggering mechanism 218 is triggered by the trigger circuit 219. The foil or ribbon conductor 200,202 is distal from the second electrode 128,130 in the non-triggered position. The elongated portion 222 electrically engages the second electrode 128,130 in the triggered position.

The trigger circuit 219 outputs a current pulse to or from the free second end 224 and from or to, respectively, the first electrode 120,124. Current flowing in opposite directions through the elongated portion 222 and the first electrode 120,124 causes the first electrode to electromagnetically repel the elongated portion 222, break the elongated portion 222 at the notch 205, and cause the elongated portion 222 to electrically engage the second electrode 128,130 in the triggered position.

In this example where there are the two gaps 108,110, the triggering mechanism 218 includes, for each of the two gaps, a triggering member 228. The trigger circuit 219 outputs a current pulse in parallel to the trigger member 228 for each of the two gaps 108,110.

Figure 14:
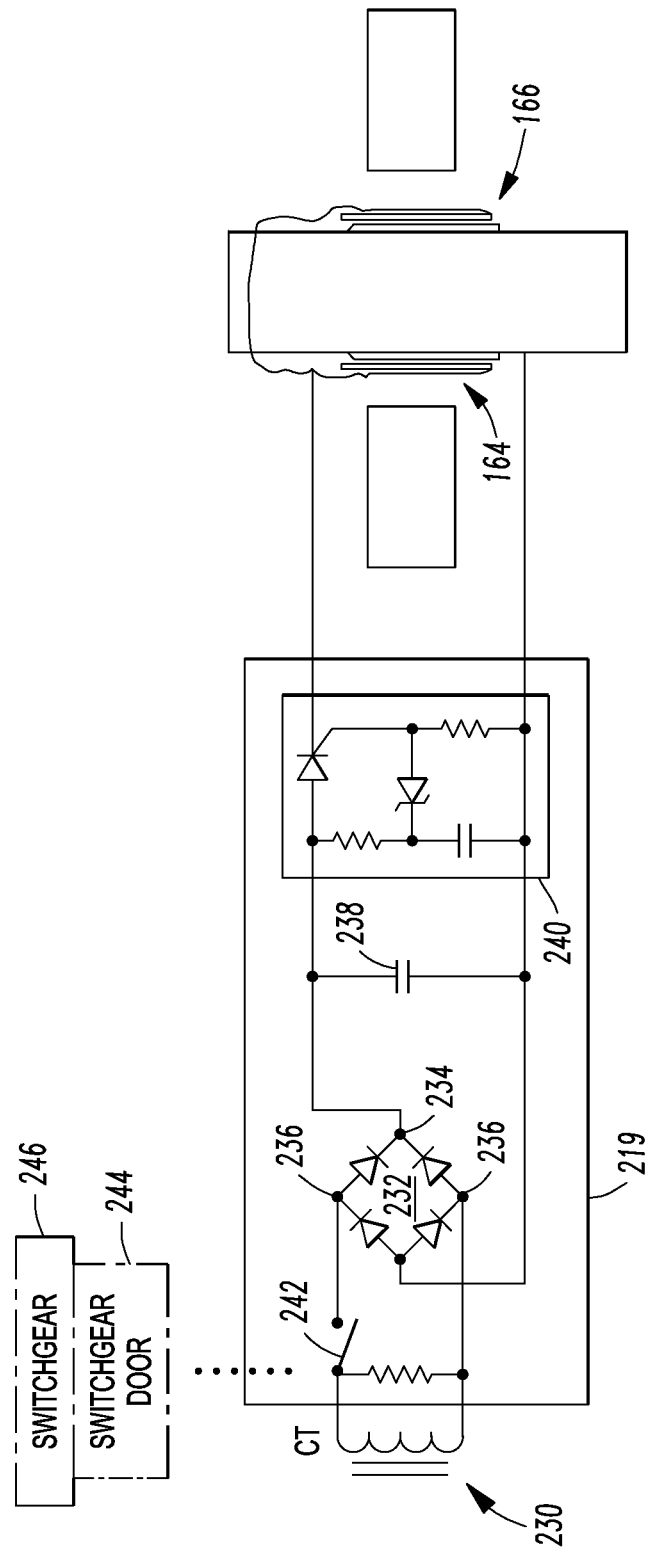
FIG. 14 is a block diagram in schematic form of a single-phase open door trigger circuit for the electromagnetic trigger of FIG. 12A.

As shown in FIG. 14, for example, the sensor 142 of FIG. 10 is a current sensor 230. The trigger circuit 148 (FIG. 10) and the trigger circuit 219 (FIGS. 13A-13B) can include a full-wave bridge 232 including an output 234 and an input 236 electrically connected to the current sensor 230, a capacitor 238 electrically connected to the output 234 of the current sensor 236, and an electronic circuit 240 structured to respond to a predetermined voltage across the capacitor 238 and output a current pulse through the corresponding electromagnetic trigger 164,166 (FIGS. 12A-12B) or triggering mechanism 218 (FIG. 13A).

The example trigger circuit 219 is a single-phase open door trigger circuit for the electromagnetic triggers 164,166 of FIGS. 12A-12B. As a non-limiting example, the current sensor 230 is structured to charge the capacitor 238 at a charge rate of about 2 kV/ms for a current corresponding to a suitable arc flash event. The example predetermined voltage is about 2 kV; and the capacitor 238 is charged to the predetermined voltage in about 1 ms. The triggering mechanism is structured to breakdown the number of gaps 14 in about 0.4 ms responsive to the current pulse therethrough. A relay contact 242 is electrically connected between the current sensor 230 and the input 236 of the full-wave bridge 232. The relay contact 242 is normally closed when a switchgear door 244 is open. The current sensor 230 in this example is a single current transformer (CT) structured to sense current flowing in a single phase of switchgear 246. The example single current transformer 230 can include, for example and without limitation, a 0.012 inch (0.03048 cm) laminated M4 silicon, steel C-core #27, having 300 turns of #16AWG with a 0.002 inch (0.00508 cm) air gap (not shown).

The example 2 kV/ms charge rate is based on the need to quickly charge the capacitor 238 and the electronic circuit 240 in order to fire the electromagnetic triggers 164,166. The faster the triggering members 164,166 can activate, the more effective the low voltage arc flash switch 4 of FIG. 1 becomes. The arc flash will be extinguished faster if the capacitor 238 can charge as fast as possible. The capacitor 238 is charged to about 2 kV in about 1 ms, which establishes the above charge rate. After the 1 ms charge time, the trigger current pulse will start and move the electromagnetic triggers 164,166 in about 0.4 ms to activate the low voltage arc flash switch 4. As a result, the arc fault will then be commutated into the low voltage arc flash switch 4 in about 1.4 ms for this example. There will be some additional commutation time as well. This example trigger circuit 219 does not sense arc flash light but becomes active when the example switchgear door 244 is open.

Figure 15:
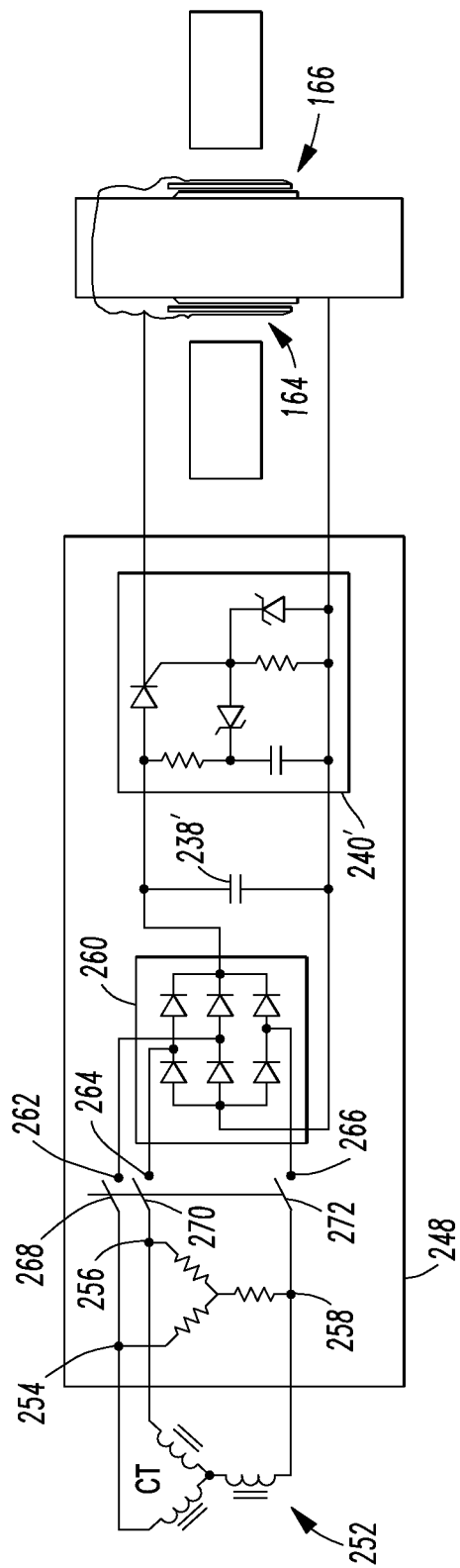
FIG. 15 is a block diagram in schematic form of a three-phase open door trigger circuit for the electromagnetic trigger of FIG. 12A.
Figure 16:
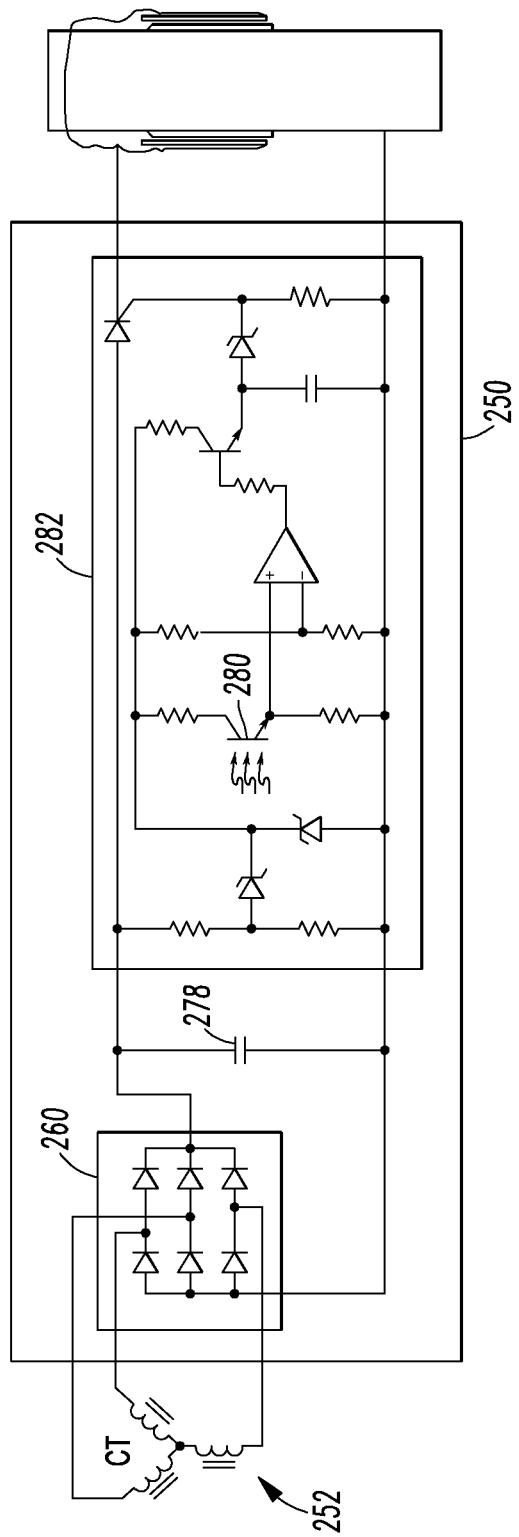
FIG. 16 is a block diagram in schematic form of a three-phase full-time protection trigger circuit for the electromagnetic trigger of FIG. 12A.

Referring to FIGS. 15 and 16, other trigger circuits 248 and 250, respectively, are shown. Here, current transformers 252, connected in a WYE configuration, sense over-currents, include three outputs 254,256,258 and are structured to sense currents flowing in three phases of switchgear (not shown). Also, the input of a full-wave bridge 260 is three discrete inputs 262,264,266 each of which is electrically connected to a corresponding one of the three outputs 254,256,258 of the WYE current transformer 252.

The trigger circuit 248 of FIG. 15 is a three-phase open door trigger circuit for the electromagnetic triggers 164,166 of FIG. 12A. This trigger circuit 248 is actively sensing current only when any switchgear door (not shown, but see the switchgear door 244 of FIG. 14) is open. Achieving a sufficient capacitor charge earlier (because of a faster charging rate) allows the electromagnetic triggers 164,166 to be activated earlier, and stops the arc flash event earlier. Thus, the arc flash energy is reduced by achieving a faster charging rate. In this example, each of three relay contacts 268,270, 272 is electrically connected between the corresponding one of the three outputs 254,256,258 of the WYE connected current transformer 252 and a corresponding one of the three discrete inputs 262,264,266 of the full-wave bridge 260. The three relay contacts 268,270,272 are normally closed when the switchgear door is open. Otherwise, the capacitor 238' and the electronic circuit 240' can be similar to the respective capacitor 238 and electronic circuit 240 of FIG. 14.

FIG. 16 shows the trigger circuit 250, which is a three-phase full-time protection trigger circuit for the electromagnetic triggers 164,166 of FIG. 12A. Here, the WYE connected current transformer 252 saturates above 10 kA and the capacitor charge rate is about 2 kV/ms. This trigger circuit 250 does employ arc flash light. The WYE connected current transformer 252 needs to saturate, because if there is no arc flash, but there is a fault current, then further charging of the capacitor 278 with every half-cycle is not desired. As such, current transformer saturation limits the charging voltage. Here, the sensors 144 of FIG. 10 include a light sensor 280. The electronic circuit 282 is structured to respond to a predetermined voltage (e.g., without limitation, about 2 kV) across the capacitor 278 and output the current pulse through a triggering mechanism, such as the example expandable electromagnetic triggers 164,166, responsive to arc flash light sensed by the light sensor 280 when there is also the predetermined voltage across the capacitor 278.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:
1. An electronic circuit comprising:
   a number of sensors structured to detect an arc flash from an uncontrolled arcing fault; and
   a trigger circuit, responsive to the detected arc flash, structured to trigger a triggering mechanism and cause a breakdown of a number of gaps within a low voltage arc flash switch, wherein said triggering mechanism is an expandable electromagnetic trigger.

2. The electronic circuit of claim 1 wherein said number of sensors are a plurality of sensors including a number of optical sensors and a number of current sensors.

3. The electronic circuit of claim 1 wherein said number of gaps are a plurality of gaps including a first gap and a second gap; wherein said expandable electromagnetic trigger is a conductive ribbon or foil including a first plurality of folds disposable within said first gap and a second plurality of folds disposable within said second gap; wherein each of said first plurality of folds and said second plurality of folds has a compressed position before said conductive ribbon or foil is triggered by said trigger circuit; and wherein each of said first plurality of folds and said second plurality of folds has a triggered position after said conductive ribbon or foil is triggered by said trigger circuit, said triggered position causing the first plurality of folds to expand and breakdown said first gap and the second plurality of folds to expand and breakdown said second gap.

4. The electronic circuit of claim 3 wherein said breakdown said first gap and said breakdown said second gap occur in about 800 microseconds.

5. The electronic circuit of claim 3 wherein said conductive ribbon is made of copper and has a width of about 0.1 inch, a thickness of about 0.003 inch and a height of about 0.325 inch.

6. The electronic circuit of claim 3 wherein each one of both of: said first plurality of folds and said second plurality of folds comprises twelve folds.

7. The electronic circuit of claim 3 wherein each one of both of said first plurality of folds and said second plurality of folds forms an accordion shape.

8. The electronic circuit of claim 3 wherein said trigger circuit outputs a current pulse to said conductive ribbon or foil; wherein current flowing through each of said first plurality of folds and said second plurality of folds causes the first plurality of folds to electromagnetically repel each other and causes the second plurality of folds to electromagnetically repel each other, thereby causing said conductive ribbon or foil to move from the compressed position to the triggered position.

9. The electronic circuit of claim 3 wherein each of said number of gaps is formed by a first electrode separated from a second electrode; wherein said triggering mechanism comprises for each of said number of gaps a U-shaped foil or ribbon conductor including a first end, a first elongated portion, a U-bend, a second elongated portion, an arcuate bend and a second end; wherein said second end is electrically connected to the first electrode; wherein said first elongated portion is parallel to said second elongated portion and separated therefrom by a first insulator; wherein said second elongated portion is parallel to said first electrode and separated therefrom by a second insulator; wherein said triggering mechanism has a compressed position before said triggering mechanism is triggered by said trigger circuit; wherein said triggering mechanism has a triggered position after said triggering mechanism is triggered by said trigger circuit; wherein said first end and said first elongated portion are distal from the second electrode in the compressed position; and wherein said first elongated portion electrically engages the second electrode in the triggered position.

10. The electronic circuit of claim 9 wherein said U-shaped foil or ribbon conductor is made of copper having a thickness of about 0.003 inch.

11. The electronic circuit of claim 9 wherein said trigger circuit outputs a current pulse to said U-shaped foil or ribbon conductor; wherein current flowing in opposite directions through the first electrode and the first elongated portion and through the first elongated portion and the second elongated portion causes the first electrode to electromagnetically repel the first elongated portion and causes the first elongated portion to electromagnetically repel the second elongated portion.

12. An electronic circuit comprising:
   a number of sensors structured to detect an arc flash from an uncontrolled arcing fault; and
   a trigger circuit, responsive to the detected arc flash, structured to trigger a triggering mechanism and cause a breakdown of a number of gaps within a low voltage arc flash switch, wherein each of said number of gaps is formed by a first electrode separated from a second electrode, wherein said triggering mechanism comprises for each of said number of gaps a foil or ribbon conductor including a first end electrically connected to the first electrode, an elongated portion and a free second end, with a notch formed in the elongated portion proximate the free second end, wherein said elongated portion is parallel to said first electrode and separated therefrom by an insulator in a non-triggered position, wherein said triggering mechanism has a first position parallel to the first electrode before said triggering mechanism is triggered by said trigger circuit, wherein said triggering mechanism has a triggered position after said triggering mechanism is triggered by said trigger circuit, wherein said foil or ribbon conductor is distal from the second electrode in the non-triggered position, and wherein said elongated portion electrically engages the second electrode in the triggered position.

13. The electronic circuit of claim 12 wherein said trigger circuit outputs a current pulse to or from the free second end and from or to, respectively, the first electrode; wherein current flowing in opposite directions through the elongated portion and the first electrode causes the first electrode to electromagnetically repel the elongated portion, break the elongated portion at the notch and cause the elongated portion to electrically engage the second electrode in the triggered position.

14. The electronic circuit of claim 12 wherein said number of gaps is two gaps; wherein said triggering mechanism comprises for each of said two gaps a triggering member; and wherein said trigger circuit outputs a current pulse in parallel to the trigger member for each of said two gaps.

15. An electronic circuit comprising:
a number of sensors structured to detect an arc flash from an uncontrolled arcing fault; and
a trigger circuit, responsive to the detected arc flash, structured to trigger a triggering mechanism and cause a breakdown of a number of gaps within a low voltage arc flash switch, wherein said number of sensors comprises a current sensor, and wherein said trigger circuit comprises:
a full-wave bridge including an output and an input electrically connected to the current sensor,
a capacitor electrically connected to the output of the current sensor, and
an electronic circuit structured to respond to a predetermined voltage across said capacitor and output a current pulse through said triggering mechanism.

16. The electronic circuit of claim 15 wherein said current sensor is structured to charge said capacitor at a charge rate of about 2 kV/ms; wherein said predetermined voltage is about 2 kV; and wherein said capacitor is charged to the predetermined voltage in about 1 ms.

17. The electronic circuit of claim 16 wherein said triggering mechanism is structured to breakdown said number of gaps in about 0.4 ms responsive to the current pulse through said triggering mechanism.

18. The electronic circuit of claim 15 wherein a relay contact is electrically connected between the current sensor and the input of said full-wave bridge; and wherein said relay contact is normally closed when a switchgear door is open.

19. The electronic circuit of claim 15 wherein said current sensor is a single current transformer structured to sense current flowing in a single phase of switchgear.

20. The electronic circuit of claim 15 wherein said current sensor is a WYE connected current transformer including three outputs and being structured to sense currents flowing in three phases of switchgear; and wherein the input of the full-wave bridge is three discrete inputs each electrically connected to a corresponding one of the three outputs of said WYE connected current transformer.

21. The electronic circuit of claim 20 wherein each of three relay contacts is electrically connected between the corresponding one of the three outputs of the WYE connected current transformer and a corresponding one of the three discrete inputs of the full-wave bridge; and wherein said three relay contacts are normally closed when a door of said switchgear is open.

22. The electronic circuit of claim 20 wherein said number of sensors further comprises a light sensor; and wherein said electronic circuit is further structured to respond to the predetermined voltage across said capacitor and output the current pulse through said triggering mechanism responsive to arc flash light sensed by said light sensor.

23. A low voltage arc flash system comprising:
a low voltage arc flash switch including a number of gaps within said low voltage arc flash switch;
a number of triggering mechanisms, one for each of said number of gaps; and
an electronic circuit comprising:
a number of sensors structured to detect an arc flash from an uncontrolled arcing fault, and
a trigger circuit, responsive to the detected arc flash, structured to trigger said number of triggering mechanisms and cause a breakdown of the number of gaps within said low voltage arc flash switch.

24. The low voltage arc flash system of claim 23 wherein said electronic circuit is disposed on, at or near said low voltage arc flash switch.

* * * * *